US008290510B2

(12) United States Patent
Thomson et al.

(10) Patent No.: US 8,290,510 B2
(45) Date of Patent: Oct. 16, 2012

(54) SYSTEM AND METHOD FOR SUPL HELD INTERWORKING

(75) Inventors: Martin Thomson, Keiraville (AU); Anthony James Winterbottom, Gwynneville (AU); Nguyen Khiem Tran, Southerland NSW (AU)

(73) Assignee: Andrew LLC, Hickory, NC (US)

( * ) Notice: Subject to any disclaimer, the term of this patent is extended or adjusted under 35 U.S.C. 154(b) by 275 days.

(21) Appl. No.: 12/782,920

(22) Filed: May 19, 2010

(65) Prior Publication Data
US 2010/0316006 A1 Dec. 16, 2010

Related U.S. Application Data

(60) Provisional application No. 61/186,256, filed on Jun. 11, 2009.

(51) Int. Cl.
*H04W 24/00* (2009.01)

(52) U.S. Cl. ............... 455/456.1; 455/432.1; 455/456.2; 455/456.3; 455/456.5; 455/456.6

(58) Field of Classification Search .... 455/432.1–432.2, 455/456.1–456.6
See application file for complete search history.

(56) References Cited

U.S. PATENT DOCUMENTS

| 3,150,372 | A | 9/1964 | Groth, Jr. |
| 3,659,085 | A | 4/1972 | Potter et al. |
| 4,728,959 | A | 3/1988 | Maloney |
| 4,814,751 | A | 3/1989 | Hawkins |
| 4,845,504 | A | 7/1989 | Roberts et al. |
| 4,891,650 | A | 1/1990 | Sheffer |
| 5,056,106 | A | 10/1991 | Wang |
| 5,218,618 | A | 6/1993 | Sagey |
| 5,317,323 | A | 5/1994 | Kennedy et al. |
| 5,327,144 | A | 7/1994 | Stilp et al. |
| 5,365,544 | A | 11/1994 | Schilling |
| 5,372,144 | A | 12/1994 | Mortier et al. |
| 5,404,376 | A | 4/1995 | Dent |
| 5,423,067 | A | 6/1995 | Manabe |
| 5,465,289 | A | 11/1995 | Kennedy |
| 5,506,863 | A | 4/1996 | Meidan et al. |
| 5,506,864 | A | 4/1996 | Schilling |
| 5,508,708 | A | 4/1996 | Ghosh et al. |
| 5,512,908 | A | 4/1996 | Herrick |

(Continued)

FOREIGN PATENT DOCUMENTS

JP 06-347529 12/1994

(Continued)

OTHER PUBLICATIONS

Y. Zhao, "Standardization of Mobile Phone Positioning for 3G Systems," IEEE Communications Magazine, Jul. 2002, pp. 108-116.

(Continued)

*Primary Examiner* — Olumide T Ajibade Akonai
(74) *Attorney, Agent, or Firm* — Duane Morris LLP

(57) ABSTRACT

A system and method for enhancing a SUPL session where a SET with a HELD client discovers an LIS of an access network and provides information received from the LIS or plurality of LISs to the SLP. The SLP determines the trustworthiness of the location information and estimates a location. The degree to which the SLP uses the location information is a function of the trustworthiness of the LIS and restraints on the location request. The location information may include a URI or domain name or other indication of location.

28 Claims, 7 Drawing Sheets

U.S. PATENT DOCUMENTS

| | | |
|---|---|---|
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,167,713 B2 | 1/2007 | Anderson |
| 7,271,765 B2 | 9/2007 | Stilp et al. |
| 7,340,259 B2 | 3/2008 | Maloney |
| 7,427,952 B2 | 9/2008 | Bull et al. |
| 7,440,762 B2 | 10/2008 | Maloney et al. |
| 7,593,738 B2 | 9/2009 | Anderson |
| 7,796,993 B2 * | 9/2010 | Kim et al. ............ 455/436 |
| 7,873,370 B2 * | 1/2011 | Shim ............ 455/456.2 |
| 8,000,722 B2 * | 8/2011 | Yan ............ 455/456.1 |
| 8,121,616 B2 * | 2/2012 | Shim ............ 455/456.1 |
| 8,185,128 B2 * | 5/2012 | Lamba et al. ............ 455/456.1 |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

FOREIGN PATENT DOCUMENTS

| | | |
|---|---|---|
| WO | 2006088472 A1 | 8/2006 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

* cited by examiner

SYSTEM AND METHOD FOR SUPL HELD INTERWORKING

RELATED APPLICATIONS

This application is with and claims priority benefit of U.S. provisional application No. 61/186,256 entitled "SUPL HELD INTERWORKING" filed Jun. 11, 2009, the entirety of which is herein incorporated by reference. This application is also related to concurrently filed and co-pending U.S. non-provisional application Ser. No. 12/813,278 entitled "USING HELD TO ASSIST IN SUPL ROAMING", the entirety of which is herein incorporated by reference.

BACKGROUND

This disclosure relates to user plane location approaches in core networks and complementary access radio and wire line access networks.

Mobile communications infrastructure is typically conceptualized in two generally separate components: the core network ("CN") and the radio access network ("RAN"). Together, this infrastructure enables user equipment ("UE"), the RAN, and CN to be developed and implemented separately according to the permissive standards set by organizations such as 3GPP and ITEU. Thus, various types of RANs, such as GERAN or UTRAN, can be paired with a single UMTS CN. Also, the UMTS standards provide for protocol separation between data related to user communications and data related to control of the network's various components. For example, within a UMTS mobile communications network, User Plane ("UP") bearers are responsible for the transfer of user data, including but not limited to voice or application data. Control Plane ("CoP") bearers handle control signaling and overall resource management.

As mobile networks transition towards 3G and beyond, location services (LCS, applications of which are sometimes referred to as Location Based Services, or LBS) have emerged as a vital service component enabled or provided by wireless communications networks. In addition to providing services conforming to government regulations such as wireless E911, LCS solutions also provide enhanced usability for mobile subscribers and revenue opportunities for network operators and service providers alike.

Position includes geographic coordinates, relative position, and derivatives such as velocity and acceleration. Although the term "position" is sometimes used to denote geographical position of an end-user while "location" is used to refer to the location within the network structure, these terms may often be used interchangeably without causing confusion. Common position measurement types used in mobile positioning or LCS include, but are not limited to, range, proximity, signal strength (such as path loss models or signal strength maps), round trip time, time of arrival, and angle of arrival. Multiple measurements can be combined, sometimes depending on which measurement types are available, to measure position. These combination approaches include, but are not limited to, radial (for example, employing multiple range measurements to solve for best agreement among circular loci), angle (for example, combining range and bearing using signal strength or round trip time), hyperbolic (for example, using multiple time-of-arrival), and real time differencing (for example, determining actual clock offsets between base stations).

Generally, LCS methods are accomplished through CoP or UP methods. CoP Location ("CoPL") refers to using control signaling within the network to provide location information of the subscriber or UE. UP Location ("UPL"), such as Secure User Plane Location ("SUPL") uses user data to provide location information. CoPL location approaches include, but are not limited to, Angle-of-Arrival ("AoA"), Observed Time-Difference-of-Arrival ("OTDOA"), Observed-Time-Difference ("OTD"), Enhanced-OTD ("E-OTD"), Assisted Global Positioning System ("A-GPS"), and Assisted Galileo Navigation Satellite System ("A-GNSS"). UPL approaches include, but are not limited to, A-GPS, and A-GNSS, where this position data is communicated over Internet Protocol ("IP").

There are two established architectures associated with location determination in modern cellular networks. The architectures are Control Plane ("CoP") and User Plane ("UP") architectures. Typically location requests are sent to a network through a query gateway function 1. Depending on the network implementation CoP 15 or UP 10 may be used but not a combination of both, as shown in FIG. 1. Note that queries may also come directly from the target device itself rather than via a gateway. Similarly, CoP or UP may be used but not both.

The difference between user plane and control plane, strictly, is that the former uses the communication bearer established with the device in order to communicate measurements. The latter uses the native signaling channels supported by the controlling network elements of the core and access to communicate measurements. As such, CoPL supports A-GPS—it uses control plane signaling interfaces to communicate GPS data to/from the handset. Similarly UPL can conduct E-OTD—the handset takes the timing measurements but it communicates them to the location platform using the data bearer.

UPL has the advantage of not depending on specific access technology to communicate measurement information. CoPL has the advantage that it can access and communicate measurements which may not be available to the device. Current models require network operators to deploy one or the other, CoPL or UPL.

CoPL uses the native signaling plane of the network to establish sessions and communicate messages associated with location requests and to communicate measurements used for determining location. The control plane is the signaling infrastructure used for procedures such as call control, hand-off, registration, and authentication in a mobile network; CoPL uses this same infrastructure for the performing location procedures. CoPL can utilize measurements made by both the control plane network elements as well as the end-user device being located.

Developed as an alternative to CoPL, Secure User Plane Location is a set of standards managed by the Open Mobile Alliance ("OMA") to transfer assistance data and positioning data over IP to aid network and terminal-based positioning technologies in ascertaining the position of a SUPL Enabled Terminal ("SET").

User Plane Location ("UPL") does not explicitly utilize the control plane infrastructure. Instead UPL assumes that a data bearer plane is available between the location platform and the end-user device. That is, a control plane infrastructure may have been involved in establishing the data bearer so that communication can occur with the device but no location-specific procedural signaling occurs over the control plane. As such, UPL is limited to obtaining measurements directly from the end-user device itself.

SUPL includes a Location User Plan ("Lup") reference point, the interface between the SUPL Location Platform ("SLP") and SET, as well as security, authentication, authorization, charging functions, roaming, and privacy functions.

For determining position, SUPL generally implements A-GPS, A-GNSS, or similar technology to communicate location data to a designated network node over Internet Protocol ("IP").

FIG. 2A illustrates an exemplary architectural diagram for SUPL. The illustrated entities represent a group of functions, and not necessarily separate physical devices. In the SUPL architecture, an SLP 201 and SET 207 are provided. The SLP 201 generally includes a SUPL Location Center ("SLC") 203 and a SUPL Positioning Center ("SPC") 205. The SLC and SPC optionally communicate over the LIp interface, for instance, when the SLC and SPC are deployed as separate entities. The SET 207 generally includes a mobile location services ("MLS") application, an application which requests and consumes location information, or a SUPL Agent, a service access point which accesses the network resources to obtain location information.

For any SET, an SLP 201 can perform the role of the home SLP ("H-SLP"), visited SLP ("V-SLP") or emergency SLP ("E-SLP"). An H-SLP for a SET includes the subscription, authentication, and privacy related data for the SET and is generally associated with a part of the SET's home PLMN. A V-SLP for a SET is an SLP selected by an H-SLP or E-SLP to assist in positioning thereof. An E-SLP for a SET is an SLP associated with or contained in the PLMN serving the SET. The E-SLP may perform positioning in association with emergency services initiated by the SET.

The SLC 203 coordinates operations of SUPL in the network and interacts with the SET over the user plane bearer to perform various functions including, but not limited to, privacy, initiation, security, roaming, charging, service management, and positioning calculation. The SPC 205 supports various functions including, but not limited to, security, assistance delivery, reference retrieval, and positioning calculation.

SUPL session initiation may be network-initiated or SET-initiated. The SUPL architecture provides various alternatives for initiating and facilitating SUPL functions. For example, a SUPL Initiation Function ("SIF") is optionally initiated using a Wireless Application Protocol Push Proxy Gateway ("WAP PPG") 211, a Short Message Service Center ("SMSC/MC") 213, or a User Datagram Protocol/Internet Protocol ("UDP/IP") 215 core, which forms user plane bearer 220.

The operation of UPL is shown in FIG. 2B. Secure User Plane Location is a standard specification for UPL. Location requests come to the SLP 201 from external applications or from the end-user device itself. If a data session does not exist between the SLP 201 and the device 207 already, then the SLP 201 may initiate a request such that an IP session (user plane bearer 220) is established between the device 207 and the SLP 201. From then on, the SLP 201 may request measurement information from the device 207. The device may also take measurements from the network 107 or from external systems such as GPS 210. Because there is no control plane connectivity to the network, the SLP 201 cannot directly request any measurement information from the network 107 itself. More information on SUPL, including the Secure User Plane Location Architecture documentation ("OMA-AD-SUPL"), can be readily obtained through OMA.

The SUPL Location Platform is a location server defined as part of the SUPL specification standardized by the OMA. It uses the User plane Location Protocol to determine the position of a SET. Each SET has a Home SLP (H-SLP) with which it has a special trust relationship.

The Http Enabled Location Delivery (HELD) protocol is a Layer 7 location configuration protocol used for retrieving location information from a Location information server (LIS) within an access network. The protocol includes options for retrieving location information in two forms; by value and by reference. The device may acquire a literal location object describing the location of the device. If the mobile device requests a location by value it can request that the LIS create a PIDF-LO document. The device may request that the LIS provide a location reference in the form of a location Uniform Resource Identifier URI or set of location URI allowing the device to distributes its LI by reference. Both of these methods can be provided concurrently from the same LIS. The protocol is an extensible application-layer protocol. The HELD protocol is defined independently of any lower layers used to transport messages from one host to another. Generally HELD relies upon the underlying transport layer to provide authentication, confidentiality and protection.

FIG. 3 is an illustration of a mobile device interaction 305 with the local access network 307 utilizing its HELD Client. The LIS 309 is a network server that provides devices with information about their location. Devices that require location information are able to request their location from the LIS. In the architectures developed by the The Internet Engineering Task Force (IETF) National Emergency Number Association (NENA) and other standards forums, the LIS is made available in the IP access network that connects the device to the Internet. In other modes of operation, the LIS 309 also provides location information to other requesters relating to a target device. The HELD protocol relies upon the LIS 309 to provide location information to the recipient 303. Similarly, the device 305 may have a DHCP client, and the LIS 309 may be a DCHP server.

The LIS 309 is responsible for providing that location information to devices within an access network 307. The LIS 309 uses knowledge of the access network and its physical topology to generate and serve location information to devices. Each access network retains specific knowledge about topology and information regarding the appropriate LIS that has the specific knowledge necessary to locate a device. Automatic discovery of the LIS is important where there is any chance of movement outside a single access network. Reliance on static configuration may lead to unexpected errors if a device moves between access networks.

An access provider (AP) operates the LIS so that devices (and targets) can retrieve their location information. The LIS exists since not all devices are capable of determining LI, and in many cases it is more efficient to determine the location information with assistance from the LIS.

Typically, the device discovers the URI for the LIS for sending the HELD protocol requests from it's initialization over the access network. The product of the LIS discovery process is one or more Http URI. These URIs can be used for location configuration using HELD.

Unlike the SLP in SUPL, the trust relationship between the device and the LIS is generally based on the access network from which the LIS is associated. There are standardized methods for HELD clients to discover LISs in arbitrary access networks and it is assumed that if the access network is trusted, then so is the LIS. Additional information regarding automatic discovery may be found in Thomson, Winterbottom, "Discovering the local Location Information Server (LIS)" IETF, Feb. 9, 2009, the entirety of which is incorporated by reference.

The access network is the network that provides a connection between a device and the Internet. This includes the physical infrastructure: cabling, radio transmitters, switching and routing nodes and servers. The access network covers the infrastructure necessary to provide a physical connection to the Internet. The access network also covers the services required to enable IP communication, which include servers that provide addressing and configuration information such as The Dynamic Host Configuration Protocol (DHCP) and Domain name server (DNS) servers. DHCP is a computer networking protocol used by hosts to retrieve IP address assignments and other configuration information.

In certain situations such as roaming, the SLP may not have enough information about network topology to determine an accurate location estimate or may be computationally limited by the urgency of the request. Additionally, the LIS may not be able to provide a literal location or a literal location with the accuracy required by the request. The present subject matter is directed to leveraging the information inherently provided by the LIS to the HELD client by the SLP in determining a location estimate.

In order to obviate the deficiencies of the prior art, the present disclosure presents a novel method of locating a mobile device. The method includes connecting a mobile device to an access network and discovering a LIS; obtaining location information from the LIS; and measuring wireless communications network characteristics to obtain network measurements. In the method the mobile device sends the measurements and location information to a location center. The location center determines the degree of trustworthiness of the LIS and determines the location of the mobile base upon the location information and the network measurements.

It is also an object of the present disclosure to present a novel method of estimating the location of a SET. In the method, the SLP receives information over a secure user plane from the SET; determines the degree of trustworthiness based on the received information, and a location estimate for the device is determined. The location of the SET is based on at least the received information and the trustworthiness of the LIS. The location estimate may be provided over the secure user plane to the SET.

It is further an object of the present disclosure to present a novel method for generating a location estimate using multiple communication connections. In the method, location information is received from a LIS from an access network, a portion of the location information is sent to a location center, and a location estimate is made by the location center as a function of the location information.

It is still further an object of the present disclosure to present a system for locating a SUPL enabled terminal with a resident HELD client. The system includes a local access network with an associated LIS and a SUPL location platform connected to a wireless communication network. In the system, the SET obtains measurements of the wireless communication network and the LIS provides information to the SET. The SET in turns provides the information and the measurements to the SLP for estimating the location of the SET.

These embodiments and many other objects and advantages thereof will be readily apparent to one skilled in the art to which the disclosed subject matter pertains from a perusal of the claims, the appended drawings, and the following detailed description of the embodiments.

BRIEF DESCRIPTION OF THE DRAWINGS

Various aspects of the present disclosure will be or will become apparent to one with skill in the art by reference to the following detailed description when considered in connection with the accompanying exemplary non-limiting embodiments.

DETAILED DESCRIPTION

Figure 1:
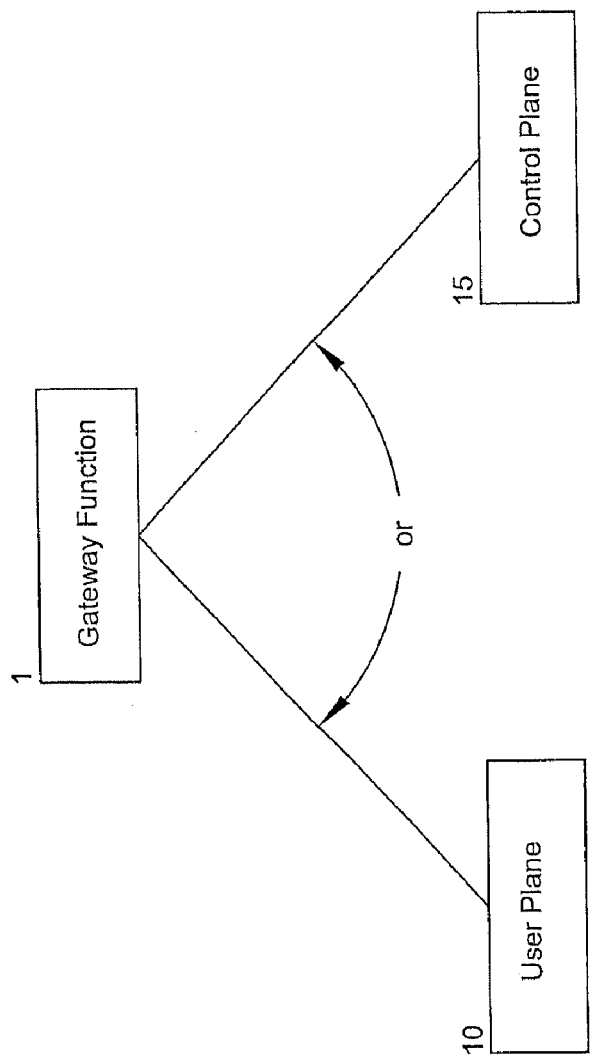
FIG. 1 is an illustration of a prior art.
Figure 2A:
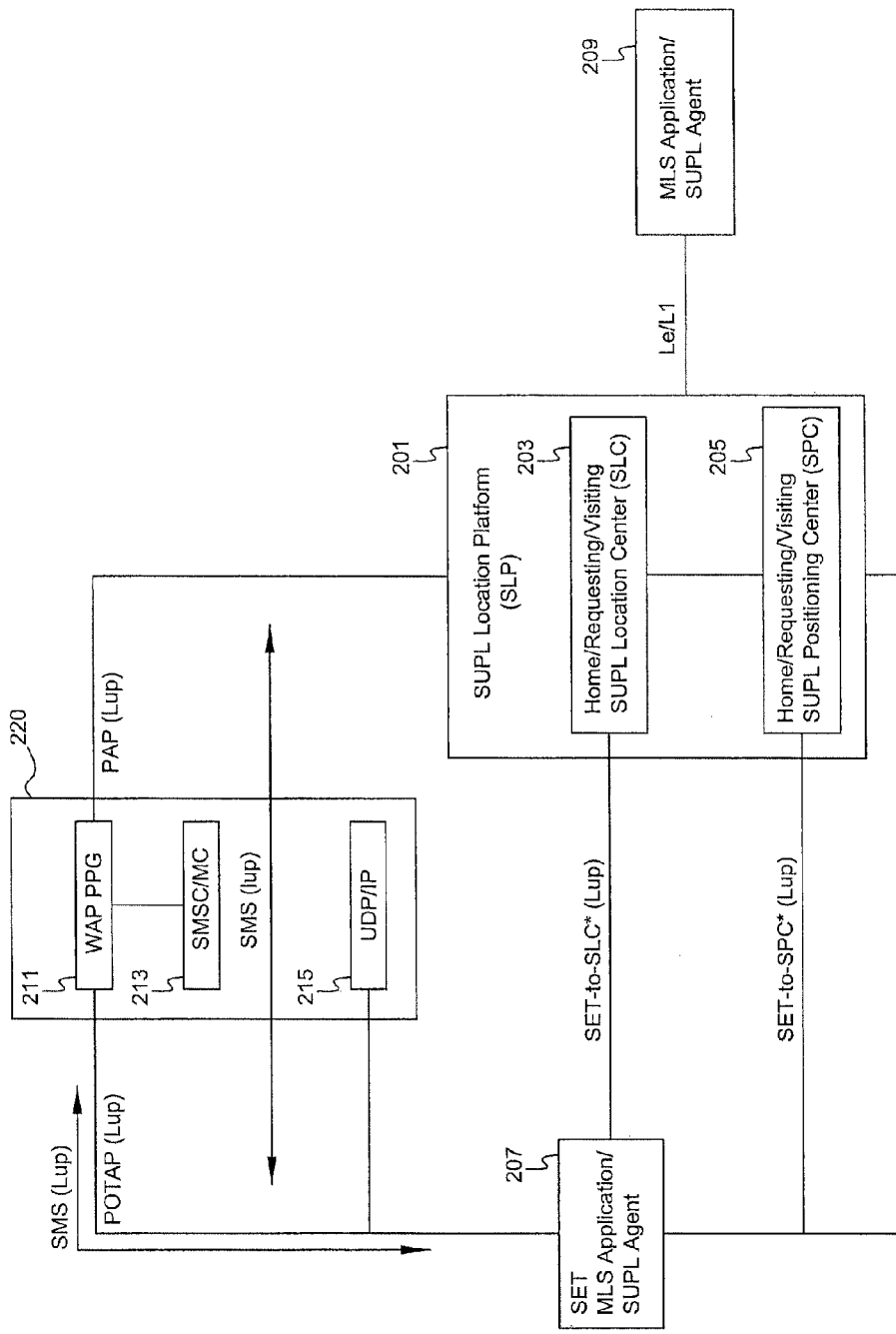
FIG. 2A is an illustration of an exemplary architectural diagram for SUPL.
Figure 2B:
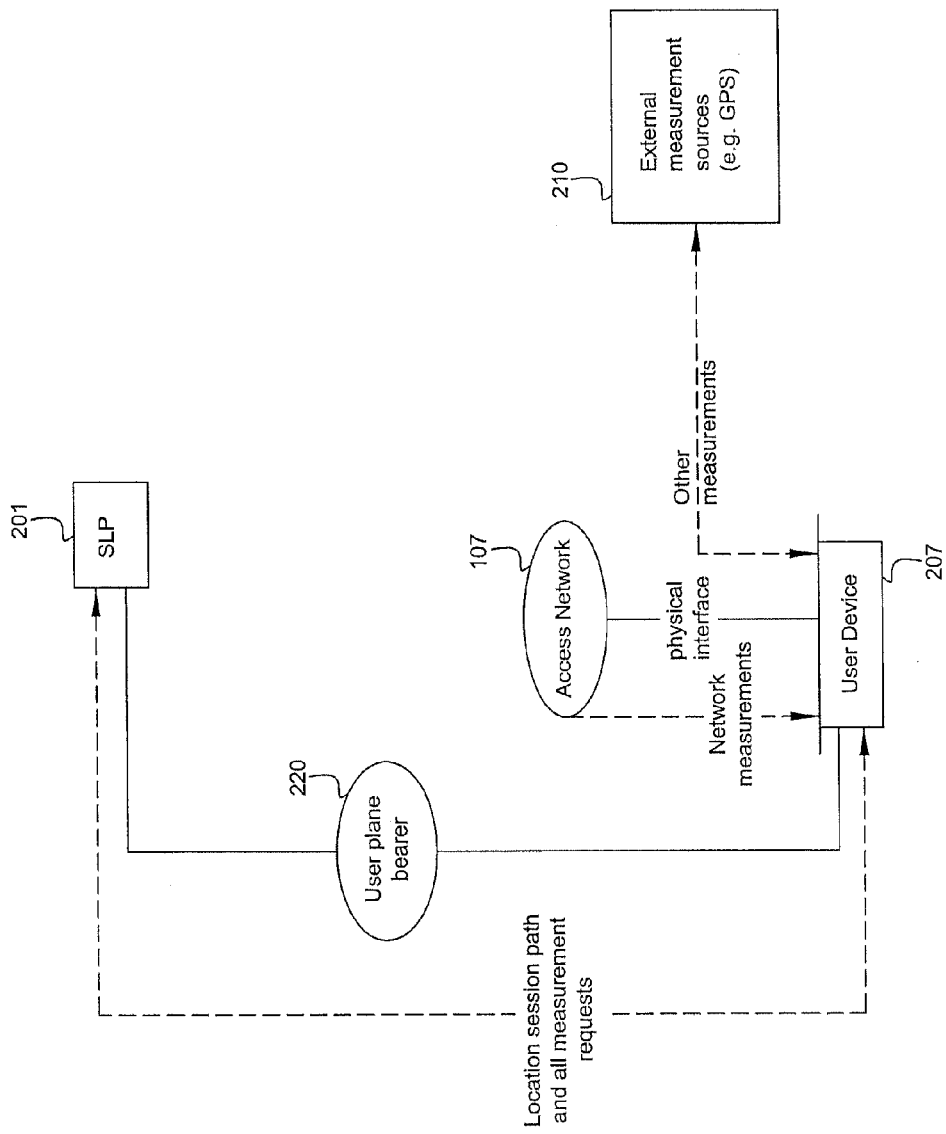
FIG. 2B is an illustration of the operation of an exemplary SUPL architecture.
Figure 3:
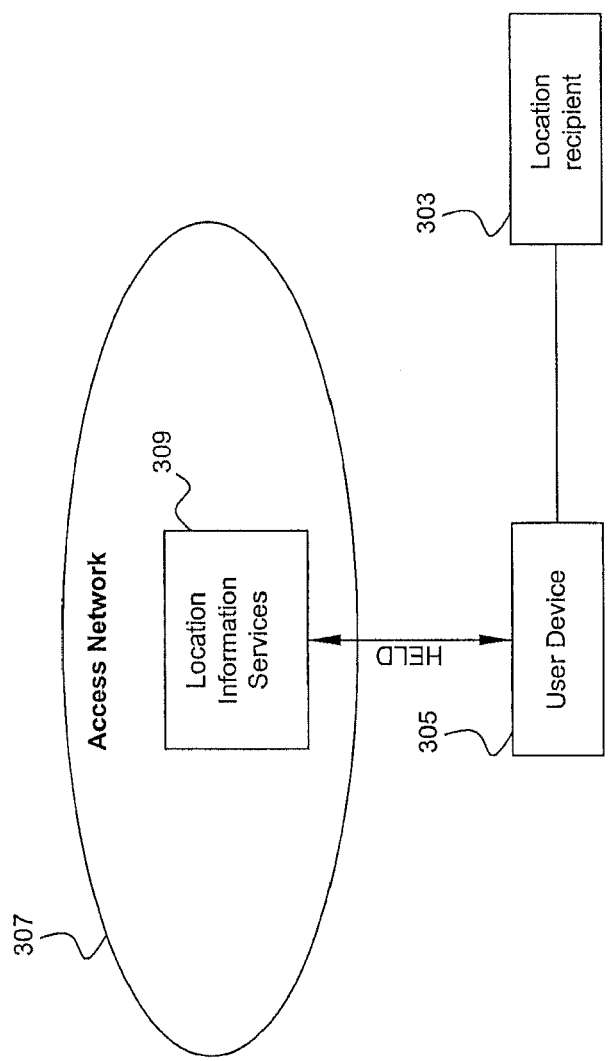
FIG. 3 is an illustration of the operation of a HELD client connected to an access network.

With reference to the figures where like elements have been given like numerical designations to facilitate an understanding of the present subject matter, the various embodiments are herein described.

The disclosed subject matter describes a system and method whereby a SET which is integrated with a HELD client can obtain information from a locally discovered LIS which it can pass to a SUPL SLP to assist with positioning.

An exemplary system encompasses a SUPL SLP, a LIS, one or more of access networks and a device which contains both a SUPL SET and HELD client. Upon commencing a SUPL session, or prior to the SET sending its first SUPL message to the SLP, the mobile device uses its HELD client to discover any LISs on any of the access networks to which it is connected. The access networks may be any of WiFi, WiMax, Bluetooth, 802.11, TDMA, CDMA, AMPS, GPRS, UMTS, LTE. WiFi, WiMax, Bluetooth, 802.11, or wire. These networks do not need to be the same access network used for connecting to the SLP. For example the mobile device may be connected to the SLP over a CDMA wireless communication system and connected to the access network over a WiFi connection. The device uses the HELD protocol to obtain IETF defined Presence Information Data Format Location Objects (PIDF-LOs) from the LISs, which may include position estimates and civic addresses. It may also obtain location URIs which enable other parties to query the LIS for a location by reference as discussed in the background. URIs or location information may also be obtained as DHCP protocol.

The SET sends a message to the SLP, the message includes any PIDF-LOs or location URIs obtained or simply the location information contained within the PIDF-LOs. It also includes various network measurements obtained by the mobile device as specified by the SUPL standard. It is these network measurements along with information regarding the network topology that the SLP typically uses to determine the location of the mobile device. Upon receiving this data, the SLP can take the information provided in the PIDF-LOs into account when calculating a location for the device subject to a determination that the information is accurate or considered trustworthy. For example, if the SLP confirms that the LIS identified either via a PIDF-LO or location URI is trustworthy, the SLP may opt to use the location provided by the LIS instead of calculating its own, thus saving time and reducing battery consumption on the SET. Alternatively, if the source LIS is only semi-trusted, the SLP may elect to cross-check the returned location with its own calculations prior to reporting them, for example by confirming that the position estimated by the semi-trusted LIS is at least consistent with a coarse position estimate calculated by the SLP based on the supplied network measurements. Or, the SLP might decide to use the position estimate from LIS as a starting estimate for its own calculations, or to use the civic address provided in the PIDF-LO, but to calculate its own more accurate positioning estimate. The SLP may also choose to report the identity of the LIS to third parties to allow them to query the LIS directly for updated positions.

Figure 4:
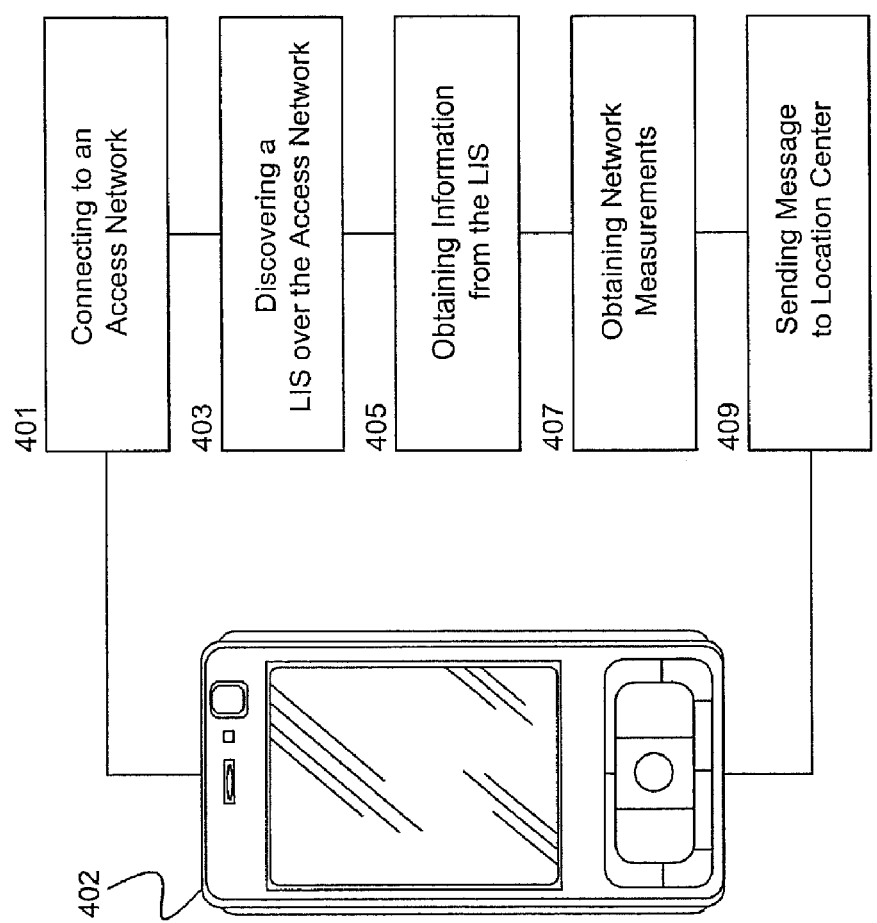
FIG. 4 is a flow chart illustrating the operation of a SET according to an embodiment of the present subject matter.

FIG. 4 shows the operation of the SET 402 upon receiving or initiating a SUPL session request. The SET 402 connects to the access network as shown in 401 and using HELD, DHCP or other protocol discovers LIS's associated with the access network in 403. It is also envisioned that the SET may already be connected to the access network when a SUPL session is initiated. Using the HELD client the SET 402 requests and obtains location information from the LIS as shown in 405. As noted above the location information may be in a literal location or a relative location. The SET 402 also takes measurements of network characteristics requested by the SLP and provides the network measurements along with the location information to the SLP over the UPL as shown in 407 and 409. These network measurements may also be measurements previously obtained. The location information sent to the SLP may include a location URI(s) of the LIS(s), digital signature of the LIS, a civic address, a geodetic location, or other location identifier or reference or combination thereof.

Figure 5:
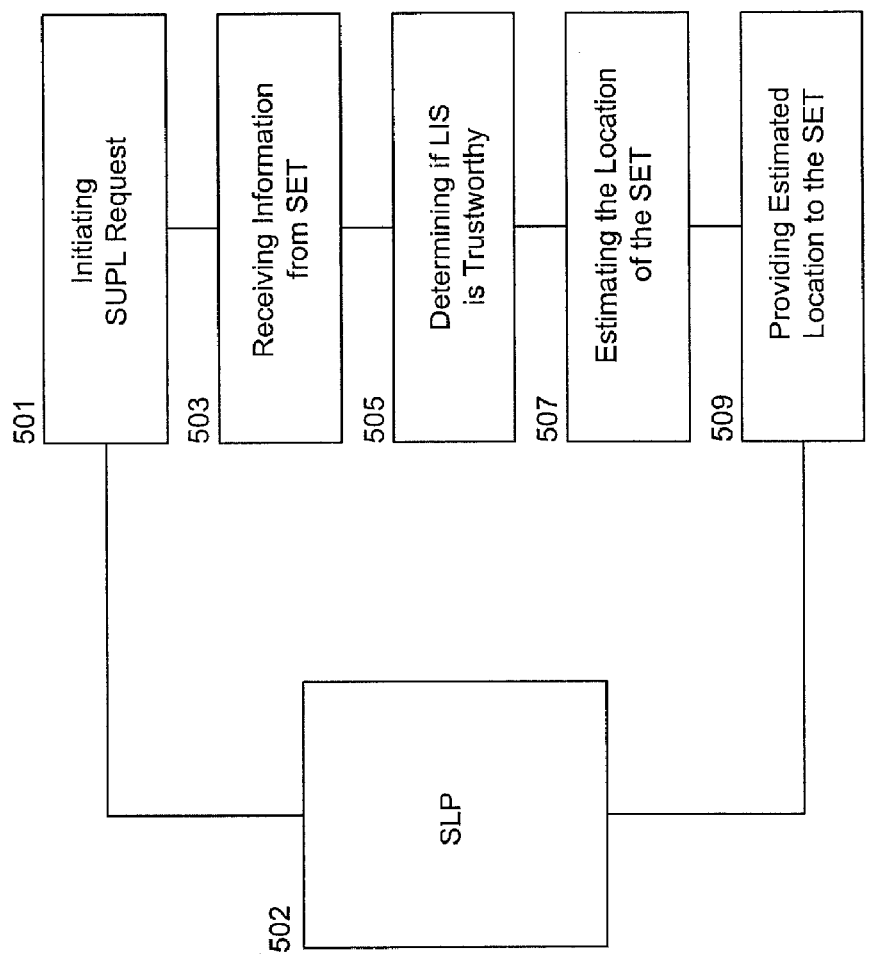
FIG. 5 is a flow chart illustrating the operation of a SLP according to an embodiment of the present subject matter.

FIG. 5 illustrates the operation of the SLP 502 in locating a mobile with the assistance of location information received from the LIS via the SET's HELD client. In FIG. 5, the SLP initiates a SUPL session by sending a SUPL start message to the SET as shown in 501. The message may include a request for network measurement to be taken by the SET. The SLP 502 receives a response from the SET including information received from the LIS and the requested network measurements as shown in 503.

The SLP 502 then determines the degree of trustworthiness of the location information based upon the access network or the LIS as shown in 505. The SLP 502 may look at a location URI of the LIS and associated with a database that links URI with LIS or Access network. The database or look up table may also include a field or fields that indicate a relative trustworthiness. The fields may include Quality of Service (QoS), consistency of data (historical trend or sequential request differences) or response delay (time to respond with location information after receiving a request). These fields may be updated as collected or on a periodic basis. A high QoS of the access network may be a strong indication of the trustworthiness of the LIS in providing accurate location information as may be a quick turn-around time. A LIS that provides location information for the same mobile that varies dramatically may be a factor that indicates less accurate information. The SLP 502 may determine if the LIS is trustworthy based upon the information in the PIDF-LOs. The SLP may determine a course location and compare the location information received from the SET with the coarse location to determine the LIS's accuracy or rely on the history of past comparisons. The degree of trustworthiness may be represented by an assigned rating, which may be maintained in the database as an updateable field or dynamically created for each location request and the rating preferably may be compared to a predetermined threshold. Trustworthiness of the LIS may also be a function of its relationship to the SLP or other LIS. A LIS in the same access network as a LIS having a trusted relationship with the SLP may also be considered trustworthy based solely or partly on that relationship.

Where information is insufficient to determine the trustworthiness of a LIS, the SLP upon determining a location estimate using only the network measurements provided by the SET, may subsequently compare the location information with the location estimate and make a post facto determination of trustworthiness that may then be used in subsequent location requests.

Upon determining the degree of trustworthiness of the LIS and thus the location information, the SLP 502 estimates a location of the SET as shown in 507. This location estimate may incorporate location information from the LIS based on its trustworthiness. For example, if the LIS is found very trustworthy, the estimate of the location may simply reflect the location information supplied by the LIS. If the LIS is somewhat trustworthy, the SLP may use the location information as a starting point or in an averaging process. If the LIS is not trustworthy, the SLP 502 may simply generate a location request ignoring the location information of the LIS. The estimated location may then be provided to the SET or third party requestor as shown in 509.

The SLP may consider additional factors in addition to trustworthiness in determining whether to utilize the location information from the LIS. If the location request has a temporal component such that an immediate response is required, the trustworthiness of the LIS may be less of a factor. In situations where only a gross location may be required, location information from a less trustworthy LIS may be used as the location estimate. The present disclosure envisions a range of tradeoff's between accuracy and time (urgency or speed requirement) that may influence the use of location information provided from the LIS in determining a location estimate by the SLP 502, these tradeoff's may be implemented in adjusting the threshold upon which the trustworthiness rating may be compared.

Figure 6:
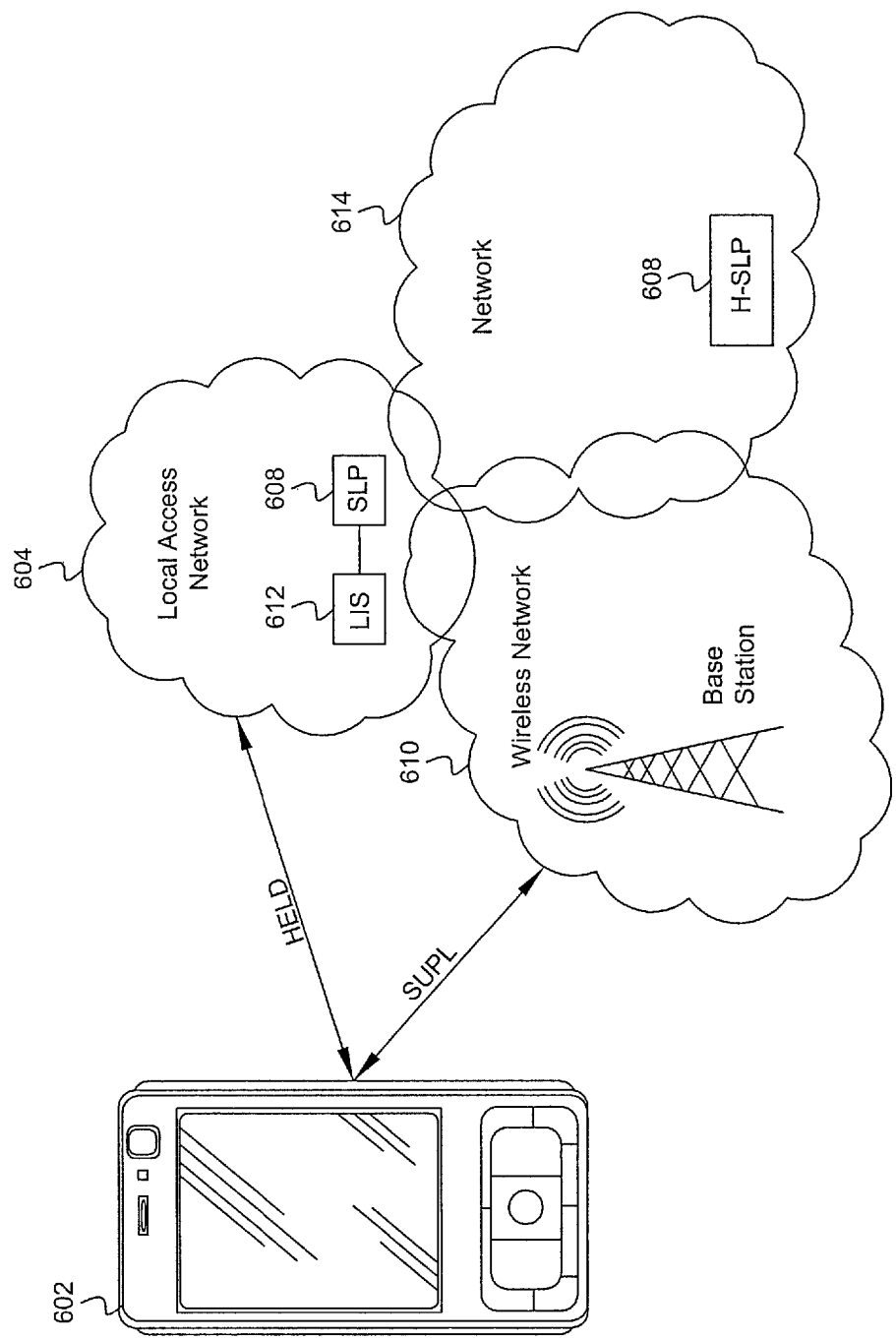
FIG. 6 is a schematic illustration of a system according to an embodiment of the present subject matter.

FIG. 6 is a representation of the interaction of the SET with a network according to an embodiment of the disclosed subject matter. In FIG. 6 the SET 602 communicates with respect to location with the local access network 604 using its HELD client. The local access network 604 maintains a LIS 612 that in this example is associated with a SLP 608. The local access network provides connection with network 614 or generally the Internet. The H-SLP 608 may be accessed through the network 614. The SET communicates over the Wireless Network 610 with respect to location according to SUPL. The networks 604, 610 and 614 are generally interconnected at least via network 614. The local access network 604 and the wireless network need not be separate networks as shown and may be the same. As discussed previously the networks may be any of WiFi, WiMax, Bluetooth, 802.11, TDMA, CDMA, AMPS, GPRS, UMTS, LTE. WiFi, WiMax, Bluetooth, or 802.11, the access network may also be a wired network or combination thereof.

Exemplary mobile devices may be but are not limited to a cellular device, text messaging device, computer, portable computer, vehicle locating device, vehicle security device, communication device, and wireless transceiver.

Exemplary methods used by the SLP to locate the mobile may include but are not limited to, TDOA, TOA, RTD, AOA, RSSI, Advanced forward link trilateration ("A-FLT"), Enhanced observed time difference ("EOTD"), Observed time difference of arrival ("OTDOA"), time of arrival ("TOA"), uplink-TOA and uplink-TDOA, Enhanced cell/sector and cell-ID, etc., and hybrid combinations thereof.

While preferred embodiments of the present subject matter have been described, it is to be understood that the embodiments described are illustrative only and that the scope of the disclosed subject matter is to be defined solely by the appended claims when accorded a full range of equivalence, many variations and modifications naturally occurring to those of skill in the art from a perusal hereof.

We claim:

1. A method of locating a mobile device comprising:
   connecting the mobile device to an access network;
   discovering a location information server (LIS) over the connected access network;
   obtaining location information from the LIS over the connected access network;
   measuring characteristics of a wireless communications network at the mobile device to obtain network measurements;
   sending a message from the mobile device to a location center, wherein the location center is a SUPL (Secure User Plane Location) Location Platform (SLP), said message containing location information received from the LIS and the network measurements;
   determining if the location information server is trustworthy; and,
   determining a location based at least upon the location information.

2. The method according to claim 1, where mobile device comprises a SUPL enabled terminal and HELD (Http Enabled Location Delivery) client and the LIS provides information using HELD.

3. The method according to claim 1, wherein the mobile device comprises a SUPL enabled terminal (SET) and a DHCP (Dynamic Host Configuration Protocol) client and the LIS is a DHCP server.

4. The method according to claim 1, where determining if the LIS is trustworthy is based on the URI (Uniform Resource Identifier) of the LIS.

5. The method according to claim 1, where determining if the LIS is trustworthy is based on Presence Information Data Format Location Objects (PIDF-LOs).

6. The method according to claim 1, where a digital signature on the location information is used to identify the LIS.

7. The method according to claim 1, wherein determining if the location information server is trustworthy is based on at least one of QOS (Quality of Service) of LIS, Consistency of Data received from the LIS, and response delay.

8. The method according to claim 7, where determining if the location information server is trustworthy comprises assigning a rating based on at least one of QOS of LIS, Consistency of Data received from the LIS, and response delay.

9. The method according to claim 8, wherein determining if the location information server is trustworthy comprises comparing the assigned rating to a threshold.

10. The method according to claim 9, wherein the threshold is based on at least a speed requirement and an accuracy requirement of a location request.

11. The method according to claim 1, where determining if the location information server is trustworthy is based on the LIS's relationship with another LIS.

12. A method of estimating the location of a SUPL (Secure User Plane Location) enabled terminal (SET) comprising:
    receiving information over a secure user plane from the SET, said information including at least the URI (Uniform Resource Identifier) of a LIS (Location Information Server) and network measurements;
    determining if the LIS is trustworthy based on the received information;
    estimating the location of the SET based on at least the received information and the trustworthiness of the LIS; and,
    providing an estimated location over the secure user plane to the SET,
    wherein the steps are performed by a SLP (SUPL Location Platform).

13. The method according to claim 12, where the step of determining if the LIS is trustworthy comprises:
    determining an estimate of the SET location and comparing the estimate with the received information.

14. The method according to claim 13, wherein the estimate is based on the network measurements.

15. The method according to claim 11, where determining if the LIS is trustworthy is based on the URI of the LIS or the Presence Information Data Format Location Objects (PIDF-LOs).

16. The method according to claim 11, wherein determining if the location information server is trustworthy is based on at least one of QOS (Quality of Service) of LIS, consistency of data received from the LIS, and response delay.

17. The method according to claim 16, where determining if the location information server is trustworthy comprises assigning a rating based on at least one of QOS of LIS, consistency of data received from the LIS, and response delay.

18. The method according to claim 17, wherein determining if the location information server is trustworthy comprises comparing the assigned rating to a threshold.

19. The method according to claim 18, wherein the threshold is based on at least a speed requirement and an accuracy requirement of a location request.

20. The method according to claim 8, where determining if the location information server is trustworthy is based on the LIS's relationship with another LIS.

21. The method according to claim 8, wherein the received information includes location information and the step of estimating the location of the SET based on at least the received information and the trustworthiness of the LIS, further comprises estimating the location based on at least the location information.

22. The method according to claim 8, further comprising sending information regarding the LIS to a third party if the LIS is determined to be trustworthy.

23. A method for generating a location estimate using multiple communication connections comprising:
    connecting to an access network;
    receiving location information from a location information server (LIS) on the access network;
    sending at least a portion of the location information to a location center, wherein the location center is a SUPL (Secure User Plane Location) Location Platform (SLP); and,
    receiving the location estimate from the location center, wherein the location estimate is a function of at least the portion of the location information.

24. The method according to claim 1, wherein the access network and the wireless communication network are different networks.

25. The method according to claim 1, wherein the information is received using HELD (Http Enable Location Delivery) or DHCP (Dynamic Host Configuration Protocol).

26. The method according to claim 1, where the access network is accessed from one of the group consisting of: WiFi, WiMax, Bluetooth, 802.11, TDMA, CDMA, AMPS, GPRS, UMTS, and LTE.

27. The method according to claim 1, further comprising discovering the LIS over the access network.

28. A system for locating a mobile appliance comprising:
    a SUPL (Secure User Plane Location) enable terminal (SET) having a resident HELD (Http Enable Location Delivery) client;
    a local access network accessible by the HELD client of the SET;
    a location information server (LIS) connected to the local access network;
    a SLP SUPL Location Platform (SLP) capable of estimating a location; and a wireless communication network connected to the SLP, wherein said SET being capable of taking measurements of the wireless communication network, and wherein information received from the LIS over the local access network is communicated from the SET along with the network measurements over the wireless communication network to the SLP for estimating the location of the SET.

* * * * *